(12) United States Patent
Sallam (10) Patent No.: US 9,679,136 B2
(45) Date of Patent: *Jun. 13, 2017

(54) METHOD AND SYSTEM FOR DISCRETE STATEFUL BEHAVIORAL ANALYSIS

(71) Applicant: McAfee, Inc., Santa Clara, CA (US)

(72) Inventor: Ahmed Said Sallam, Cupertino, CA (US)

(73) Assignee: McAfee, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/943,203

(22) Filed: Nov. 17, 2015

(65) Prior Publication Data
US 2016/0147995 A1    May 26, 2016

Related U.S. Application Data

(63) Continuation of application No. 13/669,209, filed on Nov. 5, 2012, now Pat. No. 9,202,048, which is a continuation of application No. 12/695,024, filed on Jan. 27, 2010, now Pat. No. 8,307,434.

(51) Int. Cl.
*G06F 11/00* (2006.01)
*G06F 21/56* (2013.01)
*G06F 21/55* (2013.01)

(52) U.S. Cl.
CPC .......... *G06F 21/561* (2013.01); *G06F 21/552* (2013.01); *G06F 2221/034* (2013.01)

(58) Field of Classification Search
CPC ...... G06F 21/10; G06F 21/121; G06F 21/564; G06F 21/56; G06F 21/561; G06F 21/552; H04L 63/145; H04L 63/14; H04L 63/1416; H04L 63/1425; H04L 63/1433
USPC ............. 726/22-26; 713/188, 193–194, 189; 709/223-225
See application file for complete search history.

(56) References Cited

U.S. PATENT DOCUMENTS

| | | | |
|---|---|---|---|
| 5,440,723 A | 8/1995 | Arnold et al. | 714/2 |
| 5,826,013 A | 10/1998 | Nachenberg | 726/22 |
| 6,357,008 B1 | 3/2002 | Nachenberg | 726/24 |
| 7,069,589 B2 | 6/2006 | Schmall et al. | 726/24 |
| 7,203,962 B1 * | 4/2007 | Moran | G06F 21/52 726/23 |
| 7,260,725 B2 | 8/2007 | Carmona et al. | 713/187 |
| 7,360,249 B1 * | 4/2008 | Szor | G06F 21/564 709/216 |

(Continued)

*Primary Examiner* — Hosuk Song
(74) *Attorney, Agent, or Firm* — Baker Botts L.L.P.

(57) ABSTRACT

A method for analyzing a computing system includes the steps of at a first moment in time, scanning the resources of the computing system for indications of malware, at a second moment in time scanning the resources of the computing system for indications of malware and determining the system executable objects loaded on the computing system, determining malware system changes, identifying a relationship between the malware system changes and the system executable objects loaded on the computing system, and identifying as suspected malware the system executable objects loaded on the computing system which have a relationship with the malware system changes. The malware system changes include differences between the results of scanning the resources of the computing system for indications of malware at the second and first moment of time.

20 Claims, 3 Drawing Sheets

(56) References Cited

U.S. PATENT DOCUMENTS

| | | | |
|---|---|---|---|
| 7,925,888 B1* | 4/2011 | Nachenberg | G06F 21/563 713/187 |
| 8,307,434 B2 | 11/2012 | Sallam | 726/22 |
| 8,677,491 B2* | 3/2014 | Turbin | G06F 11/00 713/188 |
| 8,800,040 B1* | 8/2014 | Tan | H04L 63/1408 709/224 |
| 9,202,048 B2* | 12/2015 | Sallam | G06F 21/552 |

* cited by examiner

METHOD AND SYSTEM FOR DISCRETE STATEFUL BEHAVIORAL ANALYSIS

RELATED APPLICATION

This application is a continuation of U.S. patent application Ser. No. 13/669,209 filed Nov. 5, 2012; which is a continuation of U.S. patent application Ser. No. 12/695,024 filed Jan. 27, 2010, now U.S. Pat. No. 8,307,434 granted Nov. 6, 2012, the contents of which is hereby incorporated in its entirety by reference.

TECHNICAL FIELD OF THE INVENTION

The present invention relates generally to detection of malware and, more particularly, to a method and apparatus for discrete stateful behavioral analysis.

BACKGROUND

Traditional anti-virus and anti-malware solutions, besides being reactive in nature, are unable to cope with the exponential growth in malware attacks. Malware attacks are becoming more sophisticated and easily capable of subverting current solutions. Target attacks may be silent in nature and infect fewer machines, thus decreasing the odds that solution providers will see the particular attacks.

To meet the need for proactive protection, behavioral analysis solutions can monitor a system in real-time. However, these solutions can be complex and require some time to develop. They may require a constant monitoring of events taking place within a system's operating systems, applications, and drivers. The constant monitoring may require inserting various types of sensors into the operating system and application memory. The sensors, if not carefully designed, developed and tested may cause serious system stability and performance issues.

SUMMARY

A method for analyzing a computing system includes the steps of at a first moment in time, scanning the resources of the computing system for indications of malware, at a second moment in time scanning the resources of the computing system for indications of malware and determining the system executable objects loaded on the computing system, determining malware system changes, identifying a relationship between the malware system changes and the system executable objects loaded on the computing system, and identifying as suspected malware the system executable objects loaded on the computing system which have a relationship with the malware system changes. The malware system changes include differences between the results of scanning the resources of the computing system for indications of malware at the second and first moment of time.

In a further embodiment, an article of manufacture includes a computer readable medium and computer-executable instructions. The computer-executable instructions are carried on the computer readable medium. The instructions are readable by a processor. The instructions, when read and executed, cause the processor to at a first moment in time, scan the resources of the computing system for indications of malware, at a second moment in time, scan the resources of the computing system for indications of malware and determine system executable objects loaded on the computing system, determine malware system changes, identify a relationship between the malware system changes and the system executable objects loaded on the computing system, and identify as suspected of malware the system executable objects loaded on the computing system for which a relationship with the malware system changes has been identified. The malware system changes include differences between the results of scanning the resources of the computing system for indications of malware at the second moment of time and the first moment of time.

In a further embodiment, a system for malware detection comprises a computing system and an electronic device. The electronic device is configurable to at a first moment in time, scan the resources of the computing system for indications of malware, at a second moment in time, scan the resources of the computing system for indications of malware and determine system executable objects loaded on the computing system, determine malware system changes, identify a relationship between the malware system changes and the system executable objects loaded on the computing system, and identify as suspected of malware system executable objects loaded on the computing system for which a relationship with the malware system changes has been identified. The malware system changes comprise one or more differences between the results of scanning the resources of the computing system for indications of malware at the second moment of time and the first moment of time.

BRIEF DESCRIPTION OF THE DRAWINGS

For a more complete understanding of the present invention and its features and advantages, reference is now made to the following description, taken in conjunction with the accompanying drawings, in which.

DETAILED DESCRIPTION

Figure 1:
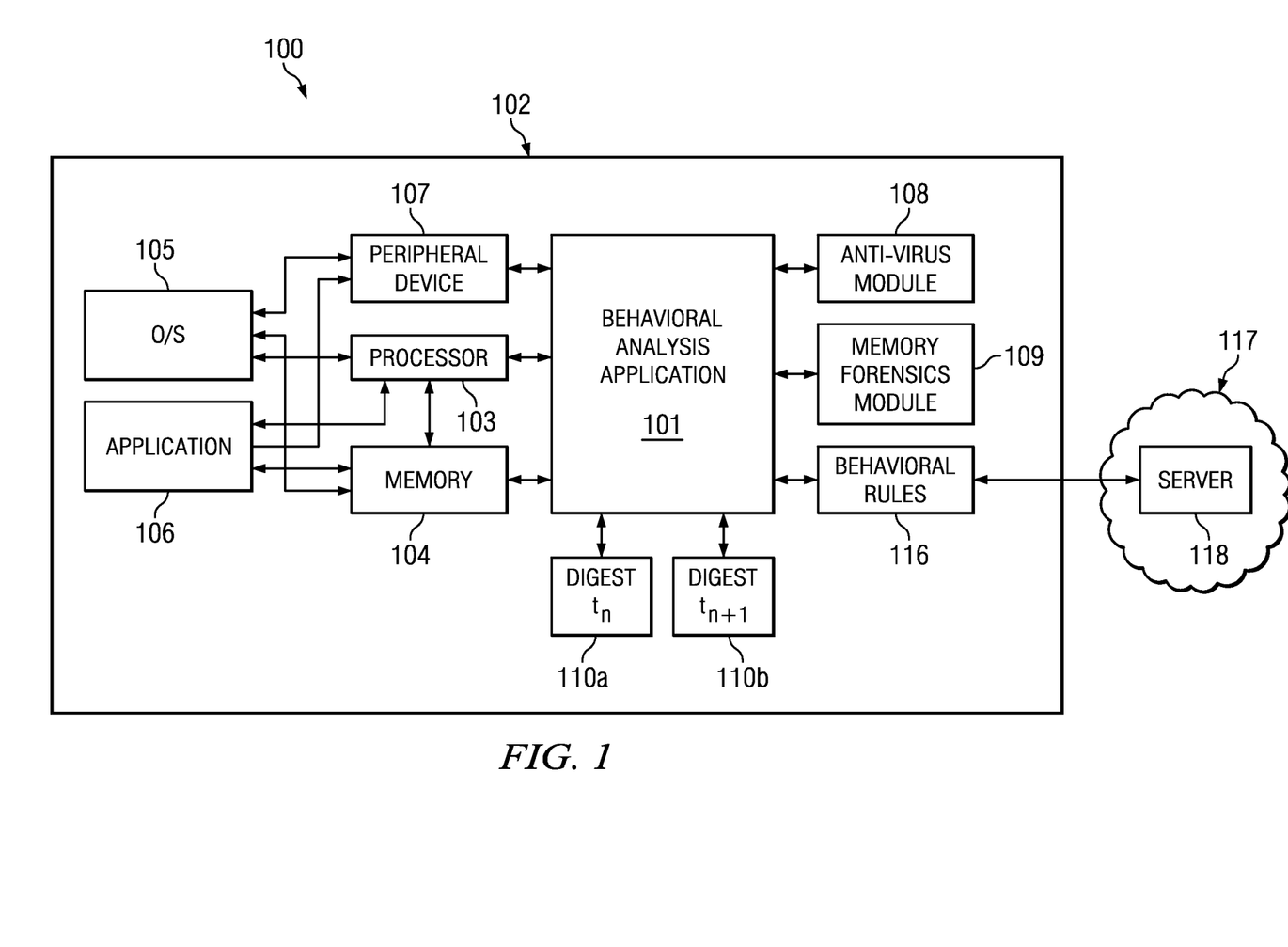
FIG. 1 is an illustration of an example system for conducting stateful behavioral analysis.

FIG. 1 is an illustration of an example system 100 for conducting stateful behavioral analysis. System 100 may comprise a behavioral analysis application 101 running on a computer 102, for conducting stateful behavioral analysis of the system 100, including computer 102, processes running on a processor 103, a memory 104, an operating system 105, an application 106, or a peripheral device 107. System 100 may comprise an anti-virus module 108, a memory forensics module 109, and behavioral rules 116, which are configured to be used by behavioral analysis application 101 to analyze system 100 for a particular instant in time, which may yield a behavioral digest 110. Behavioral analysis application 101 may be configured to analyze one or more behavioral digests 110a, 110b to conduct stateful behavioral analysis by comparing the one or more digests 110a, 110b for behavior described in a behavioral rule 116. System 100 may be configured to send or receive one or more behavioral rules 116 to a server 118.

A behavioral analysis application 101 may comprise an application operating on computer 102. Computer 102 may comprise any electronic device such as a desktop, server, laptop, personal data assistant, smartphone, or other device configurable to interpret and/or execute program instructions and/or process data. Computer 102 may comprise a processor 103 coupled to a memory 104. Processor 103 may comprise, for example a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 104. Memory 104 may be configured in part or whole as application memory, system memory, or both. Memory 104 may include any system, device, or apparatus configured to hold and/or house one or more memory modules. Each memory module may include any system, device or apparatus configured to retain program instructions and/or data for a period of time (e.g., computer-readable media). In one embodiment, behavioral analysis application 101 may reside in a memory such as memory 104, and be executed by a processor such as processor 103 by instructions contained in a memory such as memory 104. In one embodiment, behavioral analysis application 101 may operate on an electronic device separate from computer 102, such as a server connected to computer 102 over a network. In such an embodiment, behavioral analysis application 101 may reside in a memory other than memory 104, and be executed by a processor other than processor 103. In such an embodiment, behavioral analysis application 101 may be stored in and executed by resources in the server.

An operating system 105 may reside on computer 102. Operating system 105 may be stored in memory 104 and executed by processor 103 with instructions stored in memory 104. Operating system 105 may be configured to conduct any tasks known to be conducted by operating systems for computer 102, including but not limited to execution and memory management. In one embodiment, operating system 105 may be a Windows operating system. In one embodiment, operating system 105 may be an embedded operating system. In one embodiment, operating system 105 may be a Linux operating system. In one embodiment, operating system 105 may be a Macintosh operating system.

An application 106 may reside on computer 102. Application 106 may be stored in memory 104 and executed by processor 103 with instructions stored in memory 104. Application 106 may be configured to conduct any tasks known to be conducted by applications on computer 102. Application 106 may comprise an end-user application, a device driver, a run-time engine, an object file, a functional library, a segment of code, or any other compiled or uncompiled data for operation upon computer 102.

A peripheral device 107 may reside on computer 102. Peripheral device 107 may be a virtual or actual device, and may be configured to, among other things, facilitate use of computer 102 with a user, another electronic device, or a network. In one embodiment, peripheral device 107 may comprise a network port for communication between computer 102 and a network. In one embodiment, peripheral device 107 may comprise a firewall configured to protect computer 102 from attacks on the internet. Operating system and/or application 106 may be coupled or connected to peripheral device 107, and accordingly use peripheral device 107 to accomplish configuration or application tasks.

Behavioral analysis application 101 may be configured to determine the presence or threat of malware on computer 102. Malware may comprise digital content that produces unwanted activity. Malware may take many different forms, including, but not limited to, viruses, Trojans, worms, spyware, unsolicited electronic messages, phishing attempts, or any combination thereof. In one embodiment, behavioral analysis application 101 may be configured to determine the presence or threat of malware on computer 102 through the effects of various system processes such as operating system 105 and application 106. In one embodiment, behavioral analysis application 101 may examine the effects of various system processes such as operating system 105 and application 106 though examination of processor 103, memory 104, and peripheral device 105.

In order to examine computer 102 for malware, behavioral analysis application 101 may employ the use of an anti-virus module 108 and/or a memory forensics module 109. Anti-virus module 108 may be implemented in any manner suitable for providing anti-virus heuristics to be run on the resources of computer 102. In one embodiment, anti-virus module 108 may comprise the McAfee Anti-Virus Engine. In one embodiment, anti-virus module 108 may comprise a stand-alone application. In one embodiment, anti-virus module 108 may comprise a functional library that is accessible to behavioral analysis application 101. In one embodiment, anti-virus module 108 may comprise a portion of the behavioral analysis application 101 itself. Anti-virus module 108 may be populated with signatures, hashes, or any other suitable indication of the presence of particular kinds of malware, including computer viruses. Accordingly, anti-virus module 108 may be configured to apply any type of heuristic rule to the resources of computer 102 to determine the presence of malware. Examples of these heuristics may include, but are not limited to, a) scanning the registry database of operating system 105 looking for suspicious entries; b) scanning web browser histories of application 106 looking for suspicious downloaded executables; c) scanning open network ports of peripheral device 107 for incoming listening sockets, or outgoing connection sockets, for connections to suspicious network places. Suspicious objects or activities are reported to behavioral analysis application 101 as possible infections of malware. Heuristics of anti-virus module 108 may comprise such a hard-coded rule applied to a particular object resident in computer 102 at a particular instant in time. The heuristics of anti-virus module 108 may be stateless. Stateless anti-virus heuristics may result in analysis that is not based upon prior or subsequent analysis, or upon prior or subsequent status of the system. Stateless anti-virus heuristics may result in analysis that cannot tell how long indicia of viruses or malware were introduced to the system.

Memory forensics module 109 may be implemented in any manner suitable for analyzing, at a particular moment in time, the memory of an operating system 105 or an application 106 for malicious entries. In one embodiment, memory forensics module 109 may comprise integrity checking tools. In one embodiment, memory forensics module 109 may comprise a stand-alone application. In one embodiment, memory forensics module 109 may comprise a functional library that is accessible to behavioral analysis application 101. In one embodiment, memory forensics module 109 may comprise a portion of the behavioral analysis application 101 itself. Memory forensics module 109 may be configured in any suitable way to detect malicious changes in memory 104 being used by operating system 105 or application 106. For example, memory forensics module 109 may be configured to detect hooks in memory. Hooks may comprise any code, library, object file, executable, or portion thereof that intercepts function calls, messages, or events between different software components. Hooks in memory may comprise modifications to function and function pointers. Hooks in memory may be placed by various types of malware, including but not limited to rootkits, Trojan horses, and spyware. Suspicious memory entries or changes are reported to behavioral analysis application 101 as possible infections of malware. The resources of computer 102 may be insufficient so as to allow the constant monitoring of memory by memory forensics module 109. Thus, the analysis of by memory forensics module 108 may be stateless. Stateless memory forensics techniques may result in analysis that is not based upon prior or subsequent analysis, or upon prior or subsequent status of the system. Stateless memory forensics techniques may result in analysis that cannot tell how long indicia of viruses or malware were introduced to the system.

Figure 2:
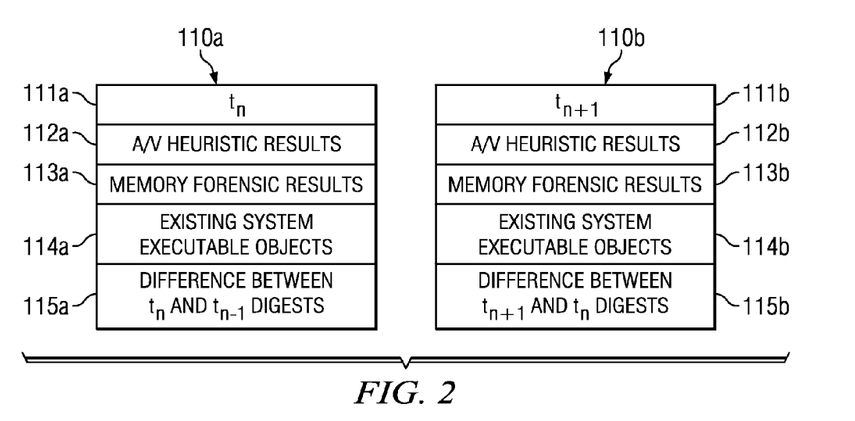
FIG. 2 illustrates example embodiments of behavioral digests.

Behavioral analysis application 101 may be configured to utilize anti-virus module 108 and/or memory forensics module 109 to search for indications of malware at a particular instant in time, $t_n$. The results may be stored in a behavioral digest 110a associated with the particular instance in time $t_n$ the analysis was conducted. FIG. 2 illustrates example embodiments of behavioral digests 110a and 110b. Behavioral digest 110a may comprise any data structure, database, record, or other device or method for storing information in memory. Behavioral digest 110a may comprise a time stamp 111a, which may be of any form indicating the particular instance in time in which behavioral analysis application 101 conducted analysis. The anti-virus heuristics results 112a may be stored in behavioral digest 110a, as may any memory forensic results 112a. Anti-virus heuristics results 112a may take the form of a list, record, data structure, or any suitable means for summarizing viruses that were scanned for in conjunction with anti-virus module and the results of the scan. Memory forensic results 112a may take the form of a list, record, data structure, or any suitable means for summarizing what portions of memory were scanned in conjunction with memory forensics module 109, and the results of the scan. A list of relevant existing system executable objects 114a may also be stored as they existed at the instance in time $t_n$ in which analysis was conducted. The list of relevant existing system executable objects may comprise processes, applications, dynamic link libraries, or device drivers. The list of relevant existing system executable objects 114a may comprise those system executable objects whose operation is to be monitored by system 100. The list of relevant existing system executable objects 114a may be determined by scanning the running processes loaded into read-only-memory, shared libraries registered with the operating system, shared libraries loaded into read-only-memory by an application or other process, or by any other suitable method to determine system executable objects that are active on system 100.

Behavioral analysis application 101 may be configured to compare the anti-virus heuristics results 112a and memory forensic results 112a against prior results—for example, the immediately prior digest—and store any differences in a difference storage 115a. Behavioral digest 110a may be stored in a secure location in a memory or a disk. In one embodiment, file system or memory mapped files can be used to store behavioral digest 110a.

Behavioral analysis application 101 may be configured to repeat the process of searching for malware or indications of malware at a subsequent instant in time, $t_{n+1}$. The results may be stored in a behavioral digest 110b. Behavioral digest 110b may comprise the same elements as behavioral digest 110a, but the specific entries in behavioral digest 110b may reflect analysis and status of computer 102 at a later instant in time $t_{n+1}$. Behavioral analysis application may be configured to compare behavioral digests 109b and 109a, and store any differences in a difference storage 115b.

Behavioral rule 116 may comprise one or more rules that describe symptoms of suspicious activity of an active and running process or application. In the prior art, some behavioral rules may be used by a monitoring application to continuously monitor the behavior of a process to observe whether it exhibits the behavior described in the rule. Behavioral rule 116 may be configured to be used by behavioral analysis application 101 to examine two discrete sets of data taken some time apart in the past, such as behavioral digest 110, to determine whether a presently loaded executable object has exhibited malware behavior.

Behavioral rule 116 may be of any form suitable to associate malware with a relationship between a change in the system 100 and an existing system executable object 114. Behavioral rule 116 may comprise a database, table, or other structure containing more than one behavioral rules. Behavioral rule 116 may comprise a module, functional library, shared library, or other mechanism accessible by behavioral analysis application 101. Behavioral rule 116 may be sent to computer 102 by a server 118 over a network 117. Server 118 may periodically update behavioral rule 116. In one embodiment, behavioral rule 116 may exist as part of behavioral analysis application 101. In one embodiment, behavioral analysis application may be configured to communicate with server 118 over network 117 to update, populate, or otherwise manage behavioral rule 116. Network 117 may comprise the Internet, an intranet, or any combination of wide-area-networks, local-area-networks, or backhaul-networks. Server 118 may be configured to receive, analyze, and aggregate a plurality of behavior analysis rules. Server 118 may be populated with behavior analysis rules from malware researchers.

In system 100, behavioral analysis application 101 may be configured to perform stateful behavioral monitoring—that is, monitoring that recognizes changing conditions—by applying behavioral rules 116 to digests 110 that summarize possibly stateless data such as A/V heuristic results 112, memory forensic results 113, and a snapshot of the existing system executable objects 114. Behavioral analysis application 101 may be configured to determine, based on the difference in the digests 110a, 110b for $t_n$ and $t_{n+1}$ in difference storage 115b, that a change has occurred in system 100 according to analysis results 112b, 113b. In addition, behavioral analysis application 101 may be configured to determine, based on the difference in the digests 110a, 110b for $t_n$ and $t_{n+1}$ in difference storage 115b, that a change has occurred in the existing system executable objects 114. Behavioral analysis application 101 may be configured to recognize the relationship of the change to the system 100 and the change in the existing system executable objects 114 through the use of behavioral rule 116.

Figure 3:
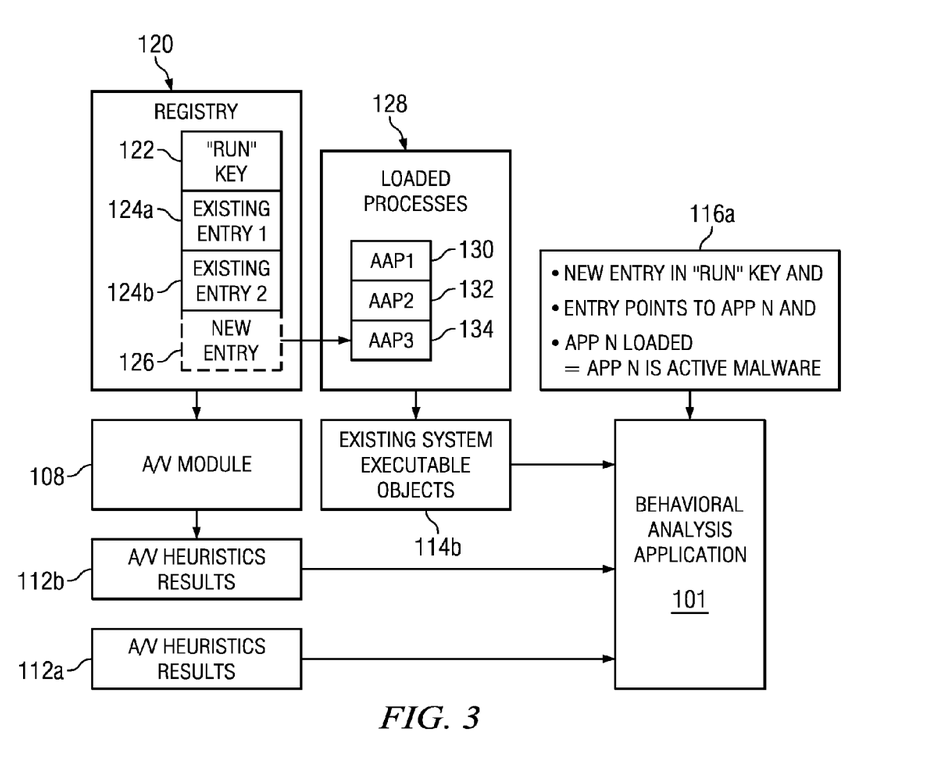
FIG. 3 is an illustration of an example of a behavioral analysis rule configured for use by behavioral analysis application, and its application; and, FIG. 4 is an illustration of an example method for conducting stateful behavioral analysis.

FIG. 3 illustrates an example of a behavioral analysis rule 116a configured for use by behavioral analysis application 101, and its application. Behavioral analysis rule 116a may have criteria for identifying a process loaded on system 100 as active malware. Behavioral analysis rule 116a may have criteria that requires that: a new entry be entered into the "RUN" key of a registry; the entry points to a particular process; and finally, the particular process must be running in the system. This rule may address malware comprising continuously running processes, or malware for which no identifying digital signature or hash is known, preventing its detection by normal, static scanning methods.

At $t_{n+1}$, behavioral analysis application 101 may be configured to utilize A/V module 108 to scan the registry 120 of system 100. Registry 120 may comprise a "RUN" key 122 with entries 124*a*, 124*b*, 126. A/V module 108 may store its results in the A/V heuristics results 112*b* of a behavioral digest 109*b* (not shown). Behavioral analysis application 101, by examining the difference between A/V heuristics results 112*b*, recorded at $t_{n+1}$, and A/V heuristics results 112*a*, recorded at $t_n$, may be configured to determine that new entry 126 was added to the "RUN" key 122 of registry 120, between $t_n$ and $t_{n+1}$. In one embodiment, behavioral analysis application 101 be configured to examine the difference between successive A/V heuristic results 112*b*, 112*a* by examining difference storage 115*b*. Behavioral analysis application may be configured to examine the contents of the new entry 126, and determine that it contains a link to the application "APP3" 134. Behavioral analysis application may be configured to access the existing system executable objects 114. Existing system executable objects 114 may have been determined in part by examining the part of the system containing loaded processes 128. Several processes may be loaded, such as "APP1" 130, "APP2" 132, and "APP3" 134. Behavioral analysis application may thus be configured to recognize, through application of behavior rule 116*a*, that "APP3" may be malware and to take suitable action in response. Behavioral analysis application 101 may thus be configured to identify a malicious system executable object without continuous behavior monitoring of the object. Behavioral analysis application 101 may thus be configured to identify a malicious system executable object without continuous behavior monitoring of the object. Behavioral analysis application may thus be configured to identify a malicious system executable object using the static, stateless data such as AN heuristic results, memory forensic results, or records of the existing system executable objects.

In another example, a behavioral rule 116 may have criteria for identifying a shared library as malware. In such an example, behavioral analysis rule 116 may have criteria that requires that: a memory hook be found on system 100; the memory hook point to a shared library; and finally, the shared library be newly loaded into memory. Behavioral analysis application may be configured to examine memory forensic results 113*b* to identify the existence of the memory hook, and the shared library to which the memory hook points. Behavioral analysis application may also be configured to examine existing system executable objects 114*b* to determine whether the shared library is loaded into memory. Behavioral analysis application may also be configured to examine difference storage 115*b* to determine whether the shared library was recently loaded. In one embodiment, behavioral analysis application may compare existing system executable objects 114*b* with a prior existing system executable objects 114*a* to determine whether the shared library was recently loaded. Behavioral analysis application may thus be configured to monitor the behavior of the system and determine whether the shared library constitutes malware.

In another example, a behavioral rule 116 may have criteria for identifying a running process on system 100 as malware. In such an example, behavioral analysis rule 116 may have criteria that requires that: in an application 106 comprising an internet browser, the internet browser history contains a universal resource locator ("URL") address; that contains the name of a process; the process is loaded in memory; the name of the process does not match the name of the website. Behavioral analysis application 101 may be configured to examine existing system executable objects 114*b* to determine what processes are loaded in memory 104. Behavioral analysis application 101 may be configured to examine anti-virus heuristic results 112*b* to determine whether application 106 contained a browser history with a process name, and to subsequently determine the process name and website. Behavioral analysis rule may be configured to determine whether the process in the browser history shared a name with a process loaded in memory 104, and whether the process had a different name than the website in question.

Behavioral analysis application 101 may be configured to apply behavior analysis rule 116 to computer 102. As a result of applying behavior analysis rule 116, a malware infection may be detected. Behavioral analysis application 101 may be configured to clean computer 102 of the malware infection through any suitable method for elimination of malware, once the malware has been identified. For example, execution of malware may be blocked, the malware or its effects quarantined, the malware or infected objects may be removed, etc. Behavioral analysis application 101 may be configured to send an alert or message to a user or administrator of computer 102 requesting permission to clean memory 104, operating system 105, application 106, or any other objects in computer 102.

In operation, operating system 105 and one or more applications 106 may be running on computer 102, utilizing system resources processor 103, memory 104, and on or more peripheral devices 107. At a particular moment in time, $t_n$, behavioral analysis application 101 may utilize anti-virus module 108 and/or memory forensics module 109 to conduct analysis of whether computer 102 contains stateless indicia of malware. Behavioral analysis application 101 may create a behavioral digest 110*a*. Behavioral analysis application 101 may store records 111*a*, 112*a* of the analyses from anti-virus module 108 and/or memory forensics module 109. Behavioral analysis application 101 may store a record 113*a* of all existing system executable objects.

At a subsequent moment in time, $t_{n+1}$, behavioral analysis application 101 may again utilize anti-virus module 108 and/or memory forensics module 109 to conduct analysis of whether computer 102 contains stateless indicia of malware. Behavioral analysis application 101 may create a second behavioral digest 110*b*. Behavioral analysis application 101 may store records 111*b*, 112*b* of the analyses in the second behavioral digest 110*b*. Behavioral analysis application 101 may store a record 113*b* of all existing system executable objects in the second behavioral digest 110*b*. Behavioral analysis application 101 may analyze the differences between the two digests 109*a*, 109*b* and store the results in a difference storage 115*b* in the second behavioral digest 110*b*.

Behavioral analysis application 101 may apply a behavioral analysis rule 116 to digest 109*b* to monitor the behavior of the existing system executable objects 114. If the differences between the two digests 109*a*, 109*b* meet the criteria established in behavioral analysis rule 116, a system executable object may be identified as malware. Thus, the behavior of a system executable object may be monitored, instead of with real-time active monitoring, by examination of evidence of its relationship to recorded system resources as recorded by otherwise stateless analysis processes. Behavioral analysis application, or another suitable application, may then clean computer 102 of malware infections detected through the use of behavioral analysis rule 116.

Figure 4:
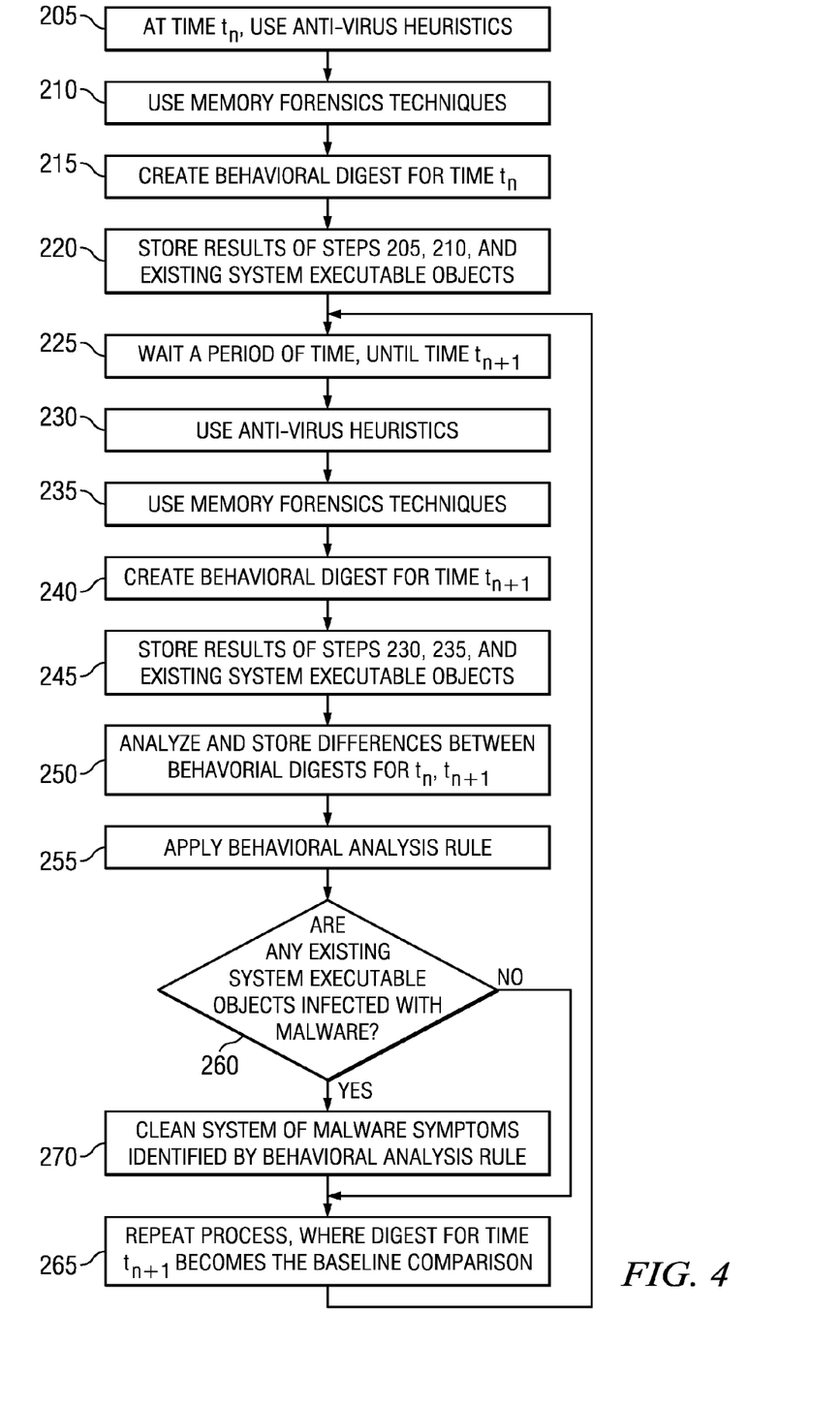

FIG. 4 is an illustration of an example method 200 for conducting stateful behavioral analysis. In step 205, at time $t_n$, anti-virus heuristics may be used to determine whether a system contains indications of malware. The indications of malware may be stateless. At the same or a different time in step 210, memory forensics techniques may be used to determine whether the system contains indications of malware. The indications of malware may be stateless. In step 215, a behavioral digest may be created for the time $t_n$. As described above, the behavioral digest may contain fields for the results of the anti-virus heuristics or memory forensic techniques, records of the existing system executable objects, and any differences between such data and the data contained in a preceding record. In step 220, the results of steps 210 and 215 may be stored in the behavioral digest for $t_n$, along with existing system executable objects.

In step 225, a future time $t_{n+1}$ may be waited upon. In step 230, anti-virus heuristics may be used to determine whether the system contains indications of malware at time $t_{n+1}$. At the same or a different time in step 235, memory forensics techniques may be used to determine whether the system contains indications of malware. In step 240, a behavioral digest may be created for the time $t_{n+1}$. In step 245, the results of steps 230 and 235 may be stored in the behavioral digest for time $t_{n+1}$, along with existing system executable objects. In step 250, the differences between the behavioral digests for time $t_{n+}$ and time $t_{n+1}$ may be stored in the behavioral digest for time $t_{n+1}$.

In step 255, the contents of and/or differences between the behavioral digests may be analyzed with a behavioral analysis rule. The behavioral analysis rule may provide criteria by which the contents of and/or differences between the behavioral digests may indicate whether any system executable objects of the system are now infected with malware. To repeat the example previously discussed, for example, the digest for $t_{n+1}$ may contain evidence from anti-virus heuristics that a new entry was added to a sensitive operating system registry key. The digest for $t_{n+1}$ may also contain evidence that the new entry points to a process that was known to be an existing system executable object at $t_{n+1}$. The digest for $t_n$ may indicate that the entry was not present at $t_n$.

In step 260, it is determined whether any existing system executable objects are infected with malware, based upon the analysis in step 255. If no existing system executable objects are infected with malware, in step 260, the process may be repeated beginning with step 225. In step 260, the process may be repeated, beginning with step 225, wherein the existing digest for $t_{n+1}$ will be the baseline comparison, replacing the digest for $t_n$ as used in step 250. In step 270, the existing system executable objects may be cleaned of the malware and/or its effects identified by the behavioral analysis rule. In step 260, the process may be repeated, beginning with step 225, wherein the existing digest for $t_{n|1}$ will be the baseline comparison, replacing the digest for $t_n$ as used in step 250.

Method 200 may be implemented using the system of FIGS. 1-3, or any other system operable to implement method 200. As such, the preferred initialization point for method 200 and the order of the steps comprising method 200 may depend on the implementation chosen. In certain embodiments, method 200 may be implemented partially or fully in software embodied in computer-readable media.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such wires, optical fibers, and other electromagnetic and/or optical carriers; and/or any combination of the foregoing.

Although the present disclosure has been described in detail, it should be understood that various changes, substitutions, and alterations can be made hereto without departing from the spirit and the scope of the disclosure as defined by the appended claims.

What is claimed is:

1. A system for behavioral analysis, comprising:
a processor;
a non-transitory memory;
a behavioral analysis application including instructions on the non-transitory memory, the instructions, when loaded and executed by the processor, configure the behavioral analysis application to:
   at a first moment in time, use anti-virus heuristics and memory forensics to create a first behavioral digest;
   store the first behavioral digest and a first set of a plurality of existing system executable objects;
   at a second moment in time, use anti-virus heuristics and memory forensics to create a second behavioral digest;
   store the second behavioral digest and a second set of a plurality of existing system executable objects;
   identify differences between the first behavioral digest and the second behavioral digest;
   identify differences between the first set and second set of existing system executable objects;
   apply a behavioral analysis rule to the identified differences between the behavioral digests and the sets of system executable objects; and
based upon the behavioral analysis rule, determine whether any system executable objects are infected with malware.

2. The system of claim 1, wherein the behavioral analysis application is further configured to:
store a first timestamp indicative of the first moment in time in the first behavioral digest;
store a second timestamp indicative of the second moment in time in the second behavioral digest, the second moment in time being after the first moment in time.

3. The system of claim 1, wherein:
to create the first behavioral digest, the behavioral analysis application is configured to:
   perform a first scan of one or more resources of a computer system in which the anti-virus heuristics and memory forensics are applied to the scanned resources to generate first results of the anti-virus heuristics and memory forensics;
   store the first results in the first behavioral digest;
to create the second behavioral digest, the behavioral analysis application is configured to:
   perform a second scan of one or more resources of the computer system in which the anti-virus heuristics and memory forensics are applied to the scanned resources to generate second results of the anti-virus heuristics and memory forensics;
   store the second results in the second behavioral digest;
to identify differences between the first behavioral digest and the second behavioral digest, the behavioral analysis application is configured to:
   identify differences between the first results in the first behavioral digest and the second results in the second behavioral digest.

4. The system of claim 3, wherein the behavioral analysis application is further configured to:
store information representing the identified differences between the first results in the first behavioral digest and the second results in the second behavioral digest and the identified differences between the first set and second set of existing system executable objects in the second behavioral digest.

5. The system of claim 1, wherein:
to store the first set of the plurality of existing system executable objects, the behavioral analysis application is configured to store information representing a list of objects in the first set of existing system executable objects in the first behavioral digest;
to store the second set of the plurality of existing system executable objects, the behavioral analysis application is configured to store information representing a list of objects in the second set of existing system executable objects in the second behavioral digest.

6. The system of claim 1, wherein the behavioral analysis application is further configured to:
determine a candidate system executable object within the first set of system executable objects;
identify the candidate system executable object as infected with malware, based upon application of the behavioral analysis rule to the identified differences between the behavioral digests and the sets of system executable objects.

7. The system of claim 1, wherein:
the anti-virus heuristics and memory forensics generate stateless result data.

8. At least one non-transitory machine accessible storage medium having instructions stored thereon, the instructions, when executed on an electronic device, to cause the electronic device to:
at a first moment in time, use anti-virus heuristics and memory forensics to create a first behavioral digest;
store the first behavioral digest and a first set of a plurality of existing system executable objects;
at a second moment in time, use anti-virus heuristics and memory forensics to create a second behavioral digest;
store the second behavioral digest and a second set of a plurality of existing system executable objects;
identify differences between the first behavioral digest and the second behavioral digest;
identify differences between the first set and second set of existing system executable objects;
apply a behavioral analysis rule to the identified differences between the behavioral digests and the sets of system executable objects; and
based upon the behavioral analysis rule, determine whether any system executable objects are infected with malware.

9. The medium of claim 8, further comprising instructions to cause the electronic device to:
store a first timestamp indicative of the first moment in time in the first behavioral digest;
store a second timestamp indicative of the second moment in time in the second behavioral digest, the second moment in time being after the first moment in time.

10. The medium of claim 8, wherein:
to create the first behavioral digest, the instructions further cause the electronic device to:
perform a first scan of one or more resources of a computer system in which the anti-virus heuristics and memory forensics are applied to the scanned resources to generate first results of the anti-virus heuristics and memory forensics;
store the first results in the first behavioral digest;
to create the second behavioral digest, the instructions further cause the electronic device to:
perform a second scan of one or more resources of the computer system in which the anti-virus heuristics and memory forensics are applied to the scanned resources to generate second results of the anti-virus heuristics and memory forensics;
store the second results in the second behavioral digest;
to identify differences between the first behavioral digest and the second behavioral digest, the instructions further cause the electronic device to:
identify differences between the first results in the first behavioral digest and the second results in the second behavioral digest.

11. The medium of claim 10, further comprising instructions to cause the electronic device to:
store information representing the identified differences between the first results in the first behavioral digest and the second results in the second behavioral digest and the identified differences between the first set and second set of existing system executable objects in the second behavioral digest.

12. The medium of claim 8, wherein:
to store the first set of the plurality of existing system executable objects, the instructions further cause the electronic device to store information representing a list of objects in the first set of existing system executable objects in the first behavioral digest;
to store the second set of the plurality of existing system executable objects, the instructions further cause the electronic device to store information representing a list of objects in the second set of existing system executable objects in the second behavioral digest.

13. The medium of claim 8, further comprising instructions to cause the electronic device to:
determine a candidate system executable object within the first set of system executable objects;
identify the candidate system executable object as infected with malware, based upon application of the behavioral analysis rule to the identified differences between the behavioral digests and the sets of system executable objects.

14. The medium of claim 8, wherein:
the anti-virus heuristics and memory forensics generate stateless result data.

15. A method for analyzing a computing system, comprising:
at a first moment in time, applying anti-virus heuristics and memory forensics to the computing system to create a first behavioral digest;
storing the first behavioral digest and a first set of a plurality of existing system executable objects that were active on the computing system at the first moment in time;
at a second moment in time, applying the anti-virus heuristics and memory forensics to the computing system to create a second behavioral digest;
storing the second behavioral digest and a second set of a plurality of existing system executable objects that were active on the computing system at the second moment in time;
identifying differences between the first behavioral digest and the second behavioral digest;

identifying differences between the first set and second set of existing system executable objects;

applying a behavioral analysis rule to the identified differences between the behavioral digests and the sets of system executable objects; and based upon the behavioral analysis rule, determining whether any system executable objects are infected with malware.

16. The method of claim 15, further comprising:
storing a first timestamp indicative of the first moment in time in the first behavioral digest;
storing a second timestamp indicative of the second moment in time in the second behavioral digest, the second moment in time being after the first moment in time.

17. The method of claim 15, wherein:
creating the first behavioral digest comprises:
  performing a first scan of one or more resources of a computer system in which the anti-virus heuristics and memory forensics are applied to the scanned resources to generate first results of the anti-virus heuristics and memory forensics;
  storing the first results in the first behavioral digest;
creating the second behavioral digest comprises:
  performing a second scan of one or more resources of the computer system in which the anti-virus heuristics and memory forensics are applied to the scanned resources to generate second results of the anti-virus heuristics and memory forensics;
  storing the second results in the second behavioral digest;
identifying differences between the first behavioral digest and the second behavioral digest comprises:
  identifying differences between the first results in the first behavioral digest and the second results in the second behavioral digest.

18. The method of claim 17, further comprising:
storing information representing the identified differences between the first results in the first behavioral digest and the second results in the second behavioral digest and the identified differences between the first set and second set of existing system executable objects in the second behavioral digest.

19. The method of claim 15, wherein:
storing the first set of the plurality of existing system executable objects comprises storing information representing a list of objects in the first set of existing system executable objects in the first behavioral digest;
storing the second set of the plurality of existing system executable objects comprises storing information representing a list of objects in the second set of existing system executable objects in the second behavioral digest.

20. The method of claim 15, further comprising:
determining a candidate system executable object within the first set of system executable objects;
identifying the candidate system executable object as infected with malware, based upon application of the behavioral analysis rule to the identified differences between the behavioral digests and the sets of system executable objects.

* * * * *